(12) United States Patent
Terui et al.

(10) Patent No.: US 9,570,981 B2
(45) Date of Patent: Feb. 14, 2017

(54) BIDIRECTIONAL DC-DC CONVERTER

(71) Applicants: Sanken Electric Co., Ltd., Niiza-shi (JP); National University Corporation Shimane University, Matsue-shi (JP)

(72) Inventors: Hiromitsu Terui, Niiza (JP); Hideki Asuke, Niiza (JP); Hideharu Takano, Niiza (JP); Masayoshi Yamamoto, Matsue (JP); Takahiro Kawashima, Matsue (JP)

(73) Assignees: Sanken Electric Co., Ltd., Niiza-shi (JP); National University Corporation Shimane University, Matsue-shi (JP)

( * ) Notice: Subject to any disclaimer, the term of this patent is extended or adjusted under 35 U.S.C. 154(b) by 0 days.

(21) Appl. No.: 14/385,597

(22) PCT Filed: Jan. 24, 2013

(86) PCT No.: PCT/JP2013/051465
§ 371 (c)(1),
(2) Date: Sep. 16, 2014

(87) PCT Pub. No.: WO2013/136853
PCT Pub. Date: Sep. 19, 2013

(65) Prior Publication Data
US 2015/0048810 A1 Feb. 19, 2015

(30) Foreign Application Priority Data
Mar. 16, 2012 (JP) ................. 2012-060534

(51) Int. Cl.
*H02M 3/158* (2006.01)
*H02M 3/155* (2006.01)

(52) U.S. Cl.
CPC ............. *H02M 3/158* (2013.01); *H02M 3/155* (2013.01); *H02M 3/1582* (2013.01)

(58) Field of Classification Search
CPC ..... H02M 3/155; H02M 3/158; H02M 3/1582
(Continued)

(56) References Cited

U.S. PATENT DOCUMENTS 7,638,900 B2 * 12/2009 Asuke ................. H02M 3/1582
307/81
2004/0113596 A1 6/2004 Peron
(Continued)

FOREIGN PATENT DOCUMENTS

| JP | 9-266665 | 10/1997 |
|---|---|---|
| JP | 2009-261136 | 11/2009 |

(Continued)

OTHER PUBLICATIONS

International Search Report issued Apr. 9, 2013, in PCT/JP13/051465 filed Jan. 24, 2013.

*Primary Examiner* — Fred E Finch, III
*Assistant Examiner* — Rafael O De Leon Domenech
(74) *Attorney, Agent, or Firm* — Oblon, McClelland, Maier & Neustadt, L.L.P.

(57) ABSTRACT

A bidirectional DC-DC converter includes a series circuit of a first winding of a first reactor, a second reactor, and a first switch connected to both ends of a first DC power source, a series circuit of a second switch and a second DC power source connected to both ends of the first switch, a series circuit of a second winding of the first reactor, a third reactor, a first selector switch, and a first diode connected to both ends of a series circuit of the second reactor and the first switch, a series circuit of a second selector switch, a second diode, and the second DC power source connected to both ends of a series circuit of the first selector switch and first diode, and a controller turning on/off the switches and the selector switches.

6 Claims, 4 Drawing Sheets

(58) Field of Classification Search
USPC .......................................................... 323/271
See application file for complete search history.

(56) References Cited

U.S. PATENT DOCUMENTS

| | | | |
|---|---|---|---|
| 2005/0226015 A1* | 10/2005 | Tsuruya | H02M 1/4208 |
| | | | 363/89 |
| 2007/0216390 A1 | 9/2007 | Wai et al. | |
| 2009/0262557 A1 | 10/2009 | Asuke et al. | |
| 2010/0237843 A1 | 9/2010 | Rivet et al. | |
| 2010/0277117 A1 | 11/2010 | Duan | |
| 2011/0273913 A1* | 11/2011 | Asuke | H02M 3/1584 |
| | | | 363/21.09 |

FOREIGN PATENT DOCUMENTS

| | | |
|---|---|---|
| JP | 2010-4704 | 1/2010 |
| WO | WO 2004/095682 A1 | 11/2004 |

* cited by examiner

PRIOR ART

BIDIRECTIONAL DC-DC CONVERTER

TECHNICAL FIELD

The present invention relates to a bidirectional DC-DC converter that carries out step-up operation and step-down operation.

BACKGROUND ART

As is disclosed as a car-mounted power converter in Japanese Unexamined Patent Application Publication No. 2009-261136, there is known a bidirectional DC-DC converter capable of achieving high efficiency and low noise. FIG. 1 is a circuit diagram illustrating a bidirectional DC-DC converter according to a related art. In FIG. 1, the bidirectional DC-DC converter steps up a DC voltage of a DC power source V1 and supplies the stepped-up voltage to a DC power source V2. Also, it steps down a DC voltage of the DC power source V2 and supplies the stepped-down voltage to the DC power source V1. Namely, the bidirectional DC-DC converter is a circuit having a step-up chopper circuit provided with a power regenerative function so as to operate, at the time of power regeneration, as a step-down chopper circuit.

A reactor Lc includes a winding 1c having the number of turns of n3 and a winding 1a having the number of turns of n1, the windings being wound around a core (not illustrated), electromagnetically coupled with each other, and connected in series. Both ends of the DC power source V1 are connected to a first series circuit that includes the winding 1c of the reactor Lc and a switch Tr11. Connected between the collector and emitter of the switch Tr11 is a second series circuit that includes the winding 1a of the reactor Lc, a reactor La1, a switch Tr14, a switch Tr12, and the DC power source V2. The reactor La1 may be a leakage inductance between the windings 1a and 1c of the reactor Lc.

Connected between the collector and emitter of the switch Tr11 is a third series circuit that includes a switch Tr13 and the DC power source V2.

Each of the switches Tr11 to Tr14 is an insulated gate bipolar transistor (IGBT) having a gate, an emitter, and a collector.

Connected in parallel between the collector and emitter of the switch Tr11 is a diode D11, connected in parallel between the collector and emitter of the switch Tr12 is a diode D12, connected in parallel between the collector and emitter of the switch Tr13 is a diode D13, and connected in parallel between the collector and emitter of the switch Tr14 is a diode D14.

A controller 100 applies control signals to control terminals of the switches Tr11, Tr12, Tr13, and Tr14 to turn on/off these switches, thereby carrying out step-up and step-down operations of DC voltage.

The bidirectional DC-DC converter with such a configuration according to the related art turns on/off the switches to carry out the step-up and step-down operations of DC voltage. During the step-up or step-down operation, the related art realizes a soft switching operation on each switch, as well as a recovery-less turn-off operation on each diode.

SUMMARY OF INVENTION

Problems to be Solved by Invention

The bidirectional DC-DC converter according to the related art illustrated in FIG. 1, however, needs the four switches Tr11, Tr12, Tr13, and Tr14 that are active switching devices each made of an IGBT.

In the step-down operation, the switch Tr12 and diode D14 are connected in series to increase a conduction loss. Also in the step-down operation, it is necessary to control operation timing of the two switches Tr12 and Tr13. This complicates the controller 100.

The present invention is able to provide a bidirectional DC-DC converter that realizes a simply-configured controller.

Means to Solve Problems

According to a technical aspect of the present invention, the bidirectional DC-DC converter steps up a DC voltage of a first DC power source and supplies the stepped-up voltage to a second DC power source, and also, steps down a DC voltage of the second DC power source and supplies the stepped-down voltage to the first DC power source. The bidirectional DC-DC converter includes a first reactor that includes first and second windings connected in series and electromagnetically coupled with each other, a first series circuit that is connected to both ends of the first DC power source and includes the first winding of the first reactor, a second reactor, and a first switch, a second series circuit that is connected to both ends of the first switch and includes a second switch and the second DC power source, a third series circuit that is connected to both ends of a series circuit of the second reactor and first switch and includes the second winding of the first reactor, a third reactor, a first selector switch, and a first diode, a fourth series circuit that is connected to both ends of a series circuit of the first selector switch and first diode and includes a second selector switch, a second diode, and the second DC power source, and a controller that turns on/off the first switch, second switch, first selector switch, and second selector switch to carry out step-up and step-down operations between the first and second DC power sources.

MODE OF IMPLEMENTING INVENTION

Bidirectional DC-DC converters according to embodiments of the present invention will be explained in detail with reference to the drawings.

Each of the bidirectional DC-DC converters according to the present invention is characterized in that it combines a recovery-less step-up chopper circuit and a recovery-less step-down chopper circuit together, employs selector switches to switch the step-up chopper circuit and step-down chopper circuit from one to another, and thereby realizes a simply-configured controller.

(Embodiment 1)

Figure 1:
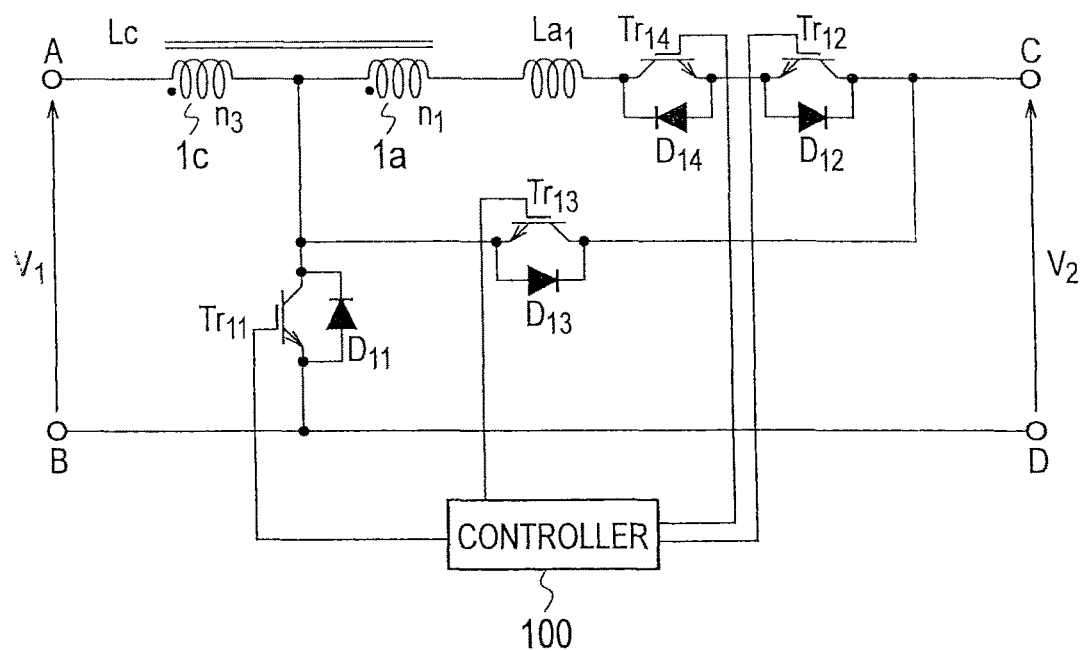
FIG. 1 is a circuit diagram illustrating a bidirectional DC-DC converter according to a related art.
Figure 2:
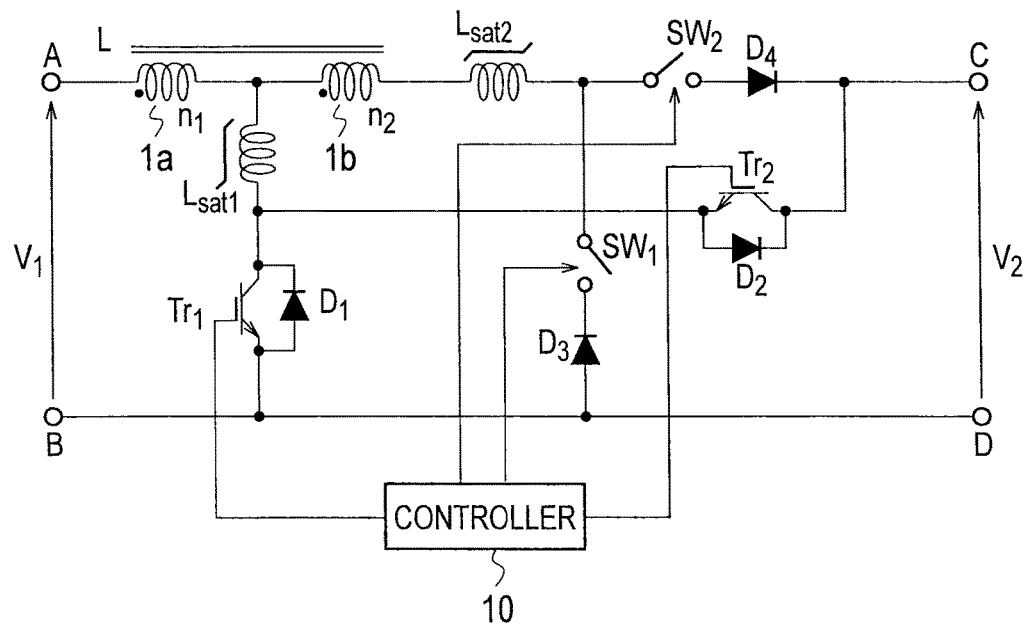
FIG. 2 is a circuit diagram illustrating a bidirectional DC-DC converter according to Embodiment 1.

FIG. 2 is a circuit diagram illustrating a bidirectional DC-DC converter according to Embodiment 1. The bidirectional DC-DC converter illustrated in FIG. 2 steps up a DC voltage of a DC power source V1 (first DC power source) and supplies the stepped-up voltage to a DC power source V2 (second DC power source). Also, it steps down a DC voltage of the DC power source V2 and supplies the stepped-down voltage to the DC power source V1. Namely, the bidirectional DC-DC converter has a circuit configuration having a step-up chopper circuit provided with a power regenerative function so as to operate as a step-down chopper circuit at the time of power regeneration.

A reactor L includes a winding 1a (a first winding) having the number of turns of n1 and a winding 1b (a second winding) having the number of turns of n2 that are wound around a core (not illustrated), electromagnetically coupled with each other, and connected in series. Connected to both ends of the DC power source V1 is a series circuit that includes the winding 1a of the reactor L (a first reactor), a saturable reactor Lsat1 (a second reactor), and a switch Tr1 (a first switch). Connected between the collector and emitter of the switch Tr1 is a series circuit that includes a switch Tr2 (a second switch) and the DC power source V2.

Both ends of the series circuit of the switch Tr1 and saturable reactor Lsat1 are connected to a series circuit that includes the winding 1b of the reactor L, a saturable reactor Lsat2 (a third reactor), a selector switch SW1 (a first selector switch), and a diode D3 (a first diode). Both ends of a series circuit of the selector switch SW1 and diode D3 are connected to a series circuit that includes a selector switch SW2 (a second selector switch), a diode D4 (a second diode), and the DC power source V2.

The saturable reactors Lsat1 and Lsat2 may be replaced with standard reactors, respectively.

The switches Tr1 and Tr2 are each an IGBT. The selector switches SW1 and SW2 are each, for example, a thyristor, an electromagnetic relay, or the like.

Connected in parallel between the collector and emitter of the switch Tr1 is a diode D1 and connected in parallel between the collector and emitter of the switch Tr2 is a diode D2.

A controller 10 applies control signals to control terminals of the switches Tr1 and Tr2 and selector switches SW1 and SW2 to turn on/off these switches, thereby carrying out step up and step-down operations of DC voltage. In the step-up operation, the controller 10 turns off the selector switch SW1 and turns on the selector switch SW2. In the step-down operation, the controller 10 turns on the selector switch SW1 and turns off the selector switch W2.

Figure 3:
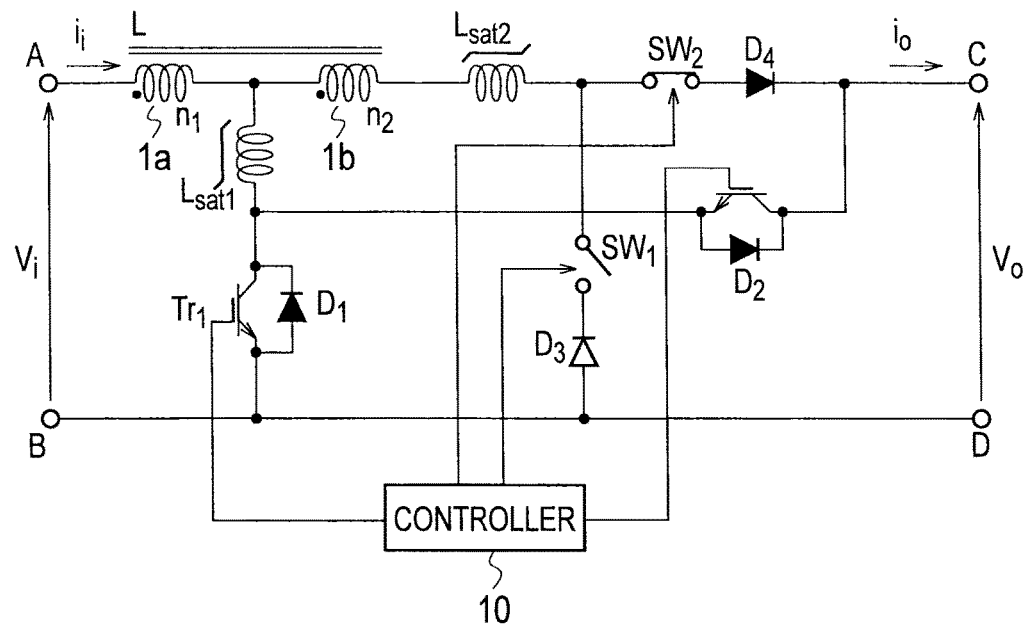
FIG. 3 is a circuit diagram illustrating a step-up operation of the bidirectional DC-DC converter according to Embodiment 1.
Figure 4:
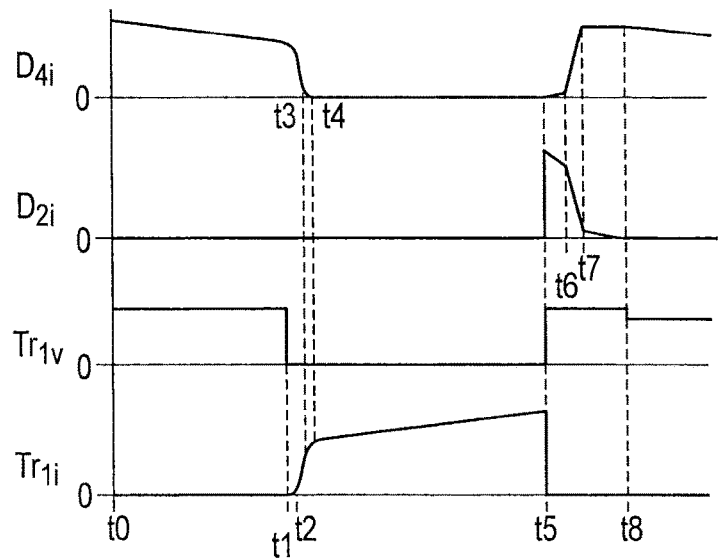
FIG. 4 is a diagram illustrating operating waveforms during the step-up operation of the bidirectional DC-DC converter according to Embodiment 1.

The step-up operation of the bidirectional DC-DC converter according to the embodiment will be explained with reference to timing charts of FIGS. 3 and 4 illustrating the step-up operation at respective parts. FIG. 3 is a circuit diagram illustrating the step-up operation of the bidirectional DC-DC converter according to Embodiment 1. In the step-up operation of FIG. 3, the DC power source V1 serves as an input power source Vi and the DC power source V2 as a load Vo.

In FIG. 3, the selector switch SW1 is in an OFF state and the selector switch SW2 in an ON state. Since the switch Tr2 is in an OFF state, the mark "Tr2" is not illustrated in FIG. 3.

In FIG. 4, Tr1v is a collector-emitter voltage of the switch Tr1, Tr1i a collector current of the switch Tr1, D2i a current of the diode D2, and D4i a current of the diode D4.

In time t4 to t5, the switch Tr1 is ON, and therefore, the current Tr1i passes clockwise through a path extending along Vi, 1a, Lsat1, and Tr1. At this time, no current passes through the diodes D2 and D4.

As the switch Tr1 turns off at time t5, the current D2i passes through a path extending along Vi, 1a, Lsat1, D2, and Vo. At the same time, a current passing through the saturable reactor Lsat2 due to a voltage generated by the winding 1b of the reactor L, i.e., the current D4i passing through the diode D4 gradually increases. This causes a commutation of current (a change in a current path) from the diode D2 to the diode D4.

At time t6, the saturable reactor Lsat2 becomes saturated and the commutation transition becomes steep. As the saturated saturable reactor Lsat1 becomes unsaturated at time t7, and therefore, the commutation transition becomes gentle and the diode D2 gradually turns off (time t8).

The switch Tr1 turns on (time t1). Though the current D4i is passing through the diode D4, the diode D4 is connected in series with the saturable reactor Lsat2. As a result, a decreasing inclination of the current is suppressed (time t3 to t4) to gradually turn off the diode D4 (time t4).

Also, an increase in the current Tr1i when the switch Tr1 turns on becomes gentle due to the saturable reactor Lsat1 (time t1 to t2), and therefore, an overlap of the current Tr1i and voltage Tr1v when the switch Tr1 turns on becomes small to realize zero-current switching of the switch Tr1.

This results in eliminating a power loss caused by recovery of the diodes D2 and D4 and realizing high efficiency.

Figure 5:
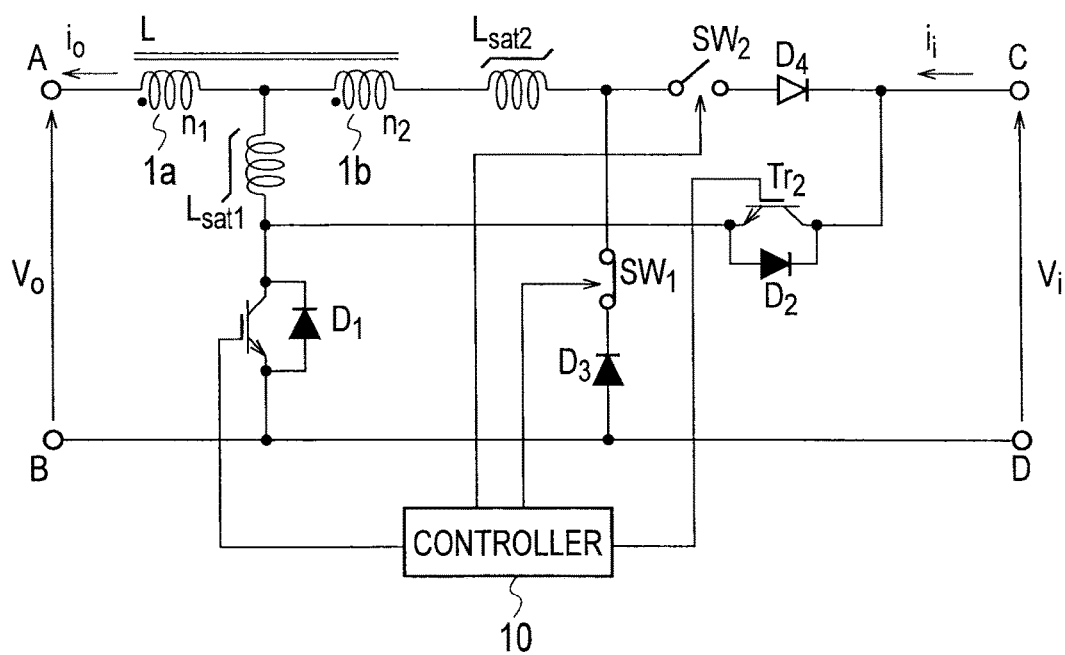
FIG. 5 is a circuit diagram illustrating a step-down operation of the bidirectional DC-DC converter according to Embodiment 1.
Figure 6:
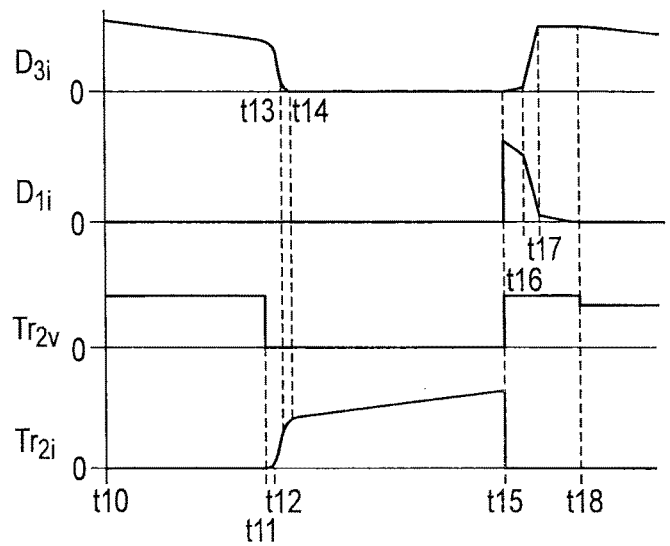
FIG. 6 is a diagram illustrating operating waveforms of the step-down operation of the bidirectional DC-DC converter according to Embodiment 1.

The step-down operation of the bidirectional DC-DC converter of the embodiment will be explained with reference to timing charts of FIGS. 5 and 6 illustrating the step-down operation at respective parts.

FIG. 5 is a circuit diagram illustrating the step-down operation of the bidirectional DC-DC converter of the embodiment. The circuit diagram of FIG. 5 illustrates a circuit part extracted from FIG. 2 that is for power regeneration. For the power regeneration, the DC power source V2 functions as an input power source Vi and the DC power source V1 as a load Vo.

In FIG. 5, the selector switch SW1 is in an ON state and the selector switch SW2 in an OFF state. The switch Tr1 is in an OFF state, and therefore, the mark "Tr1" is not illustrated in FIG. 5.

In FIG. 6, Tr2v is a collector-emitter voltage of the switch Tr2, Tr2i a collector current of the switch Tr2, D1i a current of the diode D1, and D3i a current of the diode D3.

In time t14 to t15, the switch Tr2 is ON, and therefore, the current Tr2i counterclockwise passes through a path extending along Vi, Tr2, Lsat1, 1a, and Vo. At this time, no current passes through the diode D1 and D3.

As the switch Tr2 turns off at time t15, the current D1i passes counterclockwise through a path extending along Lsat1, 1a, Vo, and D1. At time t15 to t18, a state is established in which the current passing through the diode D1 is commutated to the diode D3. At this time, the current D3i passes counterclockwise through a path extending along 1b, 1a, Vo, D3, and Lsat2, so that the current D3i increases and the current D1i decreases.

The commutation transition becomes gradual in time t15 to t16 due to the action of the saturable reactor Lsat2 and in time t17 to t18 due to the action of the saturable reactor Lsat1. In time t16 to t17, the saturable reactors Lsat1 and Lsat2 are both saturated, and therefore, the transition becomes steep. In time t17 to t18, the action of the saturable reactor Lsat1 makes a decrease in the current D1*i* gentler, and therefore, recovery-less turn-off of the diode D1 is realized at time t18.

When the switch Tr2 turns on at time t11, the diode D3 to which the current D3*i* is passing is connected in series with the saturable reactor Lsat2, and therefore, a decrease inclination of the current is suppressed (time t13 to t1) to gradually turn off the diode D3 (time t14).

An increase in the current Tr2*i* when the switch Tr2 turns on becomes gentler (time t11 to t12) due to the saturable reactor Lsat1, and therefore, an overlap of the current Tr2*i* and voltage Tr2*v* when the switch Tr2 turns on becomes smaller so that zero-current switching of the switch Tr2 is performed.

In this way, the bidirectional DC-DC converter according to Embodiment 1 combines the recovery-less step-up chopper circuit and recovery-less step-down chopper circuit together, employs the selector switches SW1 and SW2 to switch the step-up chopper circuit and step-down chopper circuit from one to another, to reduce the number of active switching devices to the two switches Tr1 and Tr2 and realize the step-up and step-down operations only by controlling ON/OFF operation of the selector switches SW1 and SW2, thereby materializing the simply-configured controller.

(Embodiment 2)

Figure 7:
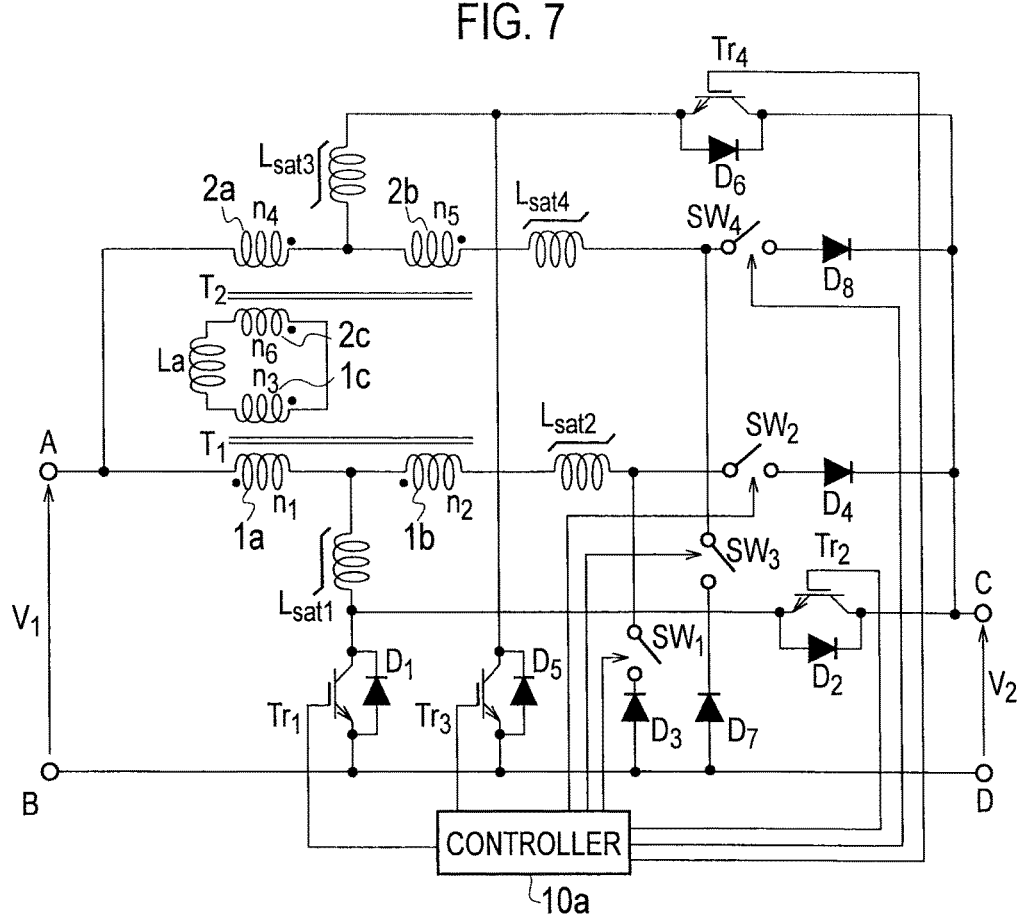
FIG. 7 is a circuit diagram illustrating a bidirectional DC-DC converter according to Embodiment 2.

FIG. 7 is a circuit diagram illustrating a bidirectional DC-DC converter according to Embodiment 2. The bidirectional DC-DC converter illustrated in FIG. 7 is a multiphase transformer-linked step-up/down chopper circuit. The bidirectional DC-DC converter of the embodiment is characterized in that it connects the bidirectional DC-DC converter of Embodiment 1 in parallel with a bidirectional DC-DC converter having the same configuration as that of Embodiment 1. The configuration of the part added to the bidirectional DC-DC converter of Embodiment 1 will be explained.

The bidirectional DC-DC converter has a transformer T1 (a first transformer), a transformer T2 (a second transformer), saturable reactors Lsat3 and Lsat4 (fourth and fifth reactors), a reactor La (a third reactor), switches Tr3 and Tr4 (third and fourth switches), diodes D5 to D8, and a controller 10*a*. Saturable reactors Lsat1 and Lsat2 correspond to first and second reactors, respectively.

The transformer T1 has a winding 1*a* (a primary winding with the number of turns of n1), a winding 1*b* (a coiled winding with the number of turns of n2) connected in series with the winding 1*a*, and a winding 1*c* (a secondary winding with the number of turns of n3) electromagnetically coupled with the winding 1*a*. The transformer T2 has the same structure as the transformer T1 and includes a winding 2*a* (a primary winding with the number of turns of n4), a winding 2*b* (a coiled winding with the number of turns of n5) connected in series with the winding 2*a*, and a winding 2*c* (a secondary winding with the number of turns of n6) electromagnetically coupled with the winding 2*a*.

Both ends of a DC power source V1 are connected through the winding 2*a* of the transformer T2 and the saturable reactor Lsat3 to the switch Tr3. Connected between the collector and emitter of the switch Tr3 is a series circuit that includes the switch Tr4 and a DC power source V2.

Both ends of a series circuit of the switch Tr3 and saturable reactor Lsat3 are connected to a series circuit that includes the winding 2*b* of the transformer T2, the saturable reactor Lsat4, the switch SW3, and the diode D7 (a third diode).

Both ends of a series circuit of the selector switch SW3 and diode D7 are connected to a series circuit that includes the selector switch SW4, the diode D8 (a fourth diode), and the DC power source V2.

The saturable reactors Lsat3 and Lsat4 may be replaced with standard reactors.

The switches Tr3 and Tr4 are each an IGBT. The selector switches SW3 and SW4 are, for example, thyristors, electromagnetic relays, or the like.

Connected in parallel between the collector and emitter of the switch Tr3 is the diode D5 and connected in parallel between the collector and emitter of the switch Tr4 is the diode D6. Both ends of a series circuit in which the winding 1*c* of the transformer T1 and the winding 2*c* of the transformer T2 are connected in series are connected to a reactor La.

The controller 10*a* applies control signals to control terminals of the switches Tr1 to Tr4 and selector switches SW1 to SW4, to turn on/off these switches and thereby carry out the step-up/down operation of DC voltage.

The controller 10*a* carries out the step-up operation by putting the selector switches SW1 and SW3 in an OFF state and the selector switches SW2 and SW4 in an ON state and carries out the step-down operation by putting the selector switches SW1 and SW3 in an ON state and the selector switches SW2 and SW4 in an OFF state.

Further, the controller 10*a* controls so that, after the switch Tr1 turns on, the switch Tr3 turns on before the switch Tr1 turns off and the switch Tr1 turns on before the switch Tr3 turns off. Namely, on every half cycle, there comes an overlapping period in which the switches Tr1 and Tr3 are simultaneously ON.

The transformer T1, switches Tr1 and Tr2, saturable reactors Lsat1 and Lsat2, selector switches SW1 and SW2, and diodes D1 to D4 form a first converter. The transformer T2, switches Tr3 and Tr4, saturable reactors Lsat3 and Lsat4, selector switches SW3 and SW4, and diodes D5 to D8 form a second converter.

An operation of the bidirectional DC-DC converter having such a configuration according to the embodiment will be explained. First, the step-up operation will be explained. In the step-up operation, the selector switches SW1 and SW3 are in an OFF state and the selector switches SW2 and SW4 are in an ON state. The switches Tr2 and Tr4 are in an OFF state.

First, the switch Tr3 is ON and the switch Tr1 turns on. At this time, a current passes clockwise through a path extending along V1, 1*a*, Lsat1, and Tr1. Accordingly, a current passing through the winding 1*a* of the transformer T1 increases. At the same time, the winding 1*c* of the transformer T1 generates a voltage to cause a current Lai passing counterclockwise through a path extending along the windings 1*c* and 2*c* and the reactor La.

The current Lai causes according to the law of equal ampere-turns of the transformer, energy is accumulated in the reactor La and the same current causes at the winding 2*c* of the transformer T2. As a result, the windings 2*a* and 2*b* of the transformer T2 induce voltages depending on the numbers of turns thereof.

When the transformer T2 has a turn ratio A as expressed by A=(n4+n5)/n4, a current of D8, that is of 1/A of the current of the switch Tr1, passes clockwise through a path extending along V1, 2a, 2b, Lsat4, SW4, D8, and V2. An output voltage V2 is the sum of a voltage (an input voltage) of the DC power source V1, a voltage generated by the winding 2a of the transformer T2, and a voltage generated by the winding 2b of the transformer T2.

A voltage generated on the transformer T2 is expressed by A×V1×D, where D is an ON-duty of the switch Tr1 (D=Ton/T) and T is a switching period of the switch Tr1. The output voltage V2 is expressed as V2 =V1 (1+A×D). Accordingly, varying the ON-duty D results in controlling the output voltage V2.

Thereafter, the switch Tr3 turns off to increase a collector-emitter voltage Tr3v of the switch Tr3. Then, a current passes clockwise through a path extending along V1, 2a, Lsat3, D6, and V2, to cause a current D6i of the diode D6.

Due to the voltage of the winding 2b of the transformer T2, however, the current of the saturable reactor Lsat3 commutates to the diode D8, to increase a current D8i to the diode D8. Accordingly, the current D6i of the diode D6 gradually decreases. When the current of the windings 2a and 2b of the transformer T2 ends to commutate to the diode D8, the diode D6 turns off. Since the current gradually decreases to turn off the diode D6, the generation of a recovery loss at the diode D6 is suppressed.

When the switch Tr3 turns on, the current of the windings 2a and 2b of the transformer T2 starts to commutate from the diode D8 to the switch Tr3.

At this time, the saturable reactor Lsat3 makes an increase in the current to the switch Tr3 gradual to realize a zero-current turn-ON operation. Accordingly, a decrease in the current of the diode D8 becomes gradual to suppress the generation of a turn-OFF recovery loss.

The current passes clockwise through a path extending along V1, 2a, Lsat3, and Tr3. Accordingly, a current of the winding 2a of the transformer T2 increases. At the same time, the winding 2c of the transformer. T2 generates a voltage to cause a current Lai of the reactor La passing counterclockwise through a path extending along 2c, La, and 1c.

The current Lai causes according to the law of equal ampere-turns of the transformer, to accumulate energy in the reactor La and cause the same current of the winding 1c of the transformer T1. As a result, the windings 1a and 1b of the transformer induce voltages depending on the numbers of turns thereof.

When the transformer T1 has a turn ratio A as expressed such as A=(n1+n2)/n1, a current of the diode D3, that is 1/A of the current to the switch Tr3, passes clockwise through a path extending along V1, 1a, 1b, Lsat2, SW2, D4, and V2. The output voltage V2 is the sum of a voltage (an input voltage) of the DC power source V1, a voltage generated by the winding 1a of the transformer T1, and a voltage generated by the winding 1b of the transformer T1.

A voltage generated on the transformer T1 is expressed by A×V1×D, where D is an ON-duty of the switch Tr3 (D=Ton/T), and T is a switching period of the switch Tr3. The output voltage V2 is expressed such as V2=V1 (1+A×D). Accordingly, varying the ON-duty D results in controlling the output voltage V2.

Thereafter, the switch Tr1 turns off and a collector-emitter voltage Tr1v of the switch Tr1 increases. Then, a current D2i of the diode D2 passes clockwise through a path extending along V1, 1a, Lsat1, D2, and V2.

Due to the voltage of the winding 1b of the transformer T1, however, the current of the saturable reactor Lsat1 commutates to the diode D4, to increase a current D4i to the diode D4. Accordingly, the current D2i of the diode D6 gradually decreases. When the current of the windings 1a and 1b of the transformer T1 ends to commutate to the diode D4, the diode D2 turns off. Since the current gradually decreases to turn off the diode D2, the generation of a recovery loss at the diode D2 is suppressed.

When the switch Tr1 turns on, the current of the windings 1a and 1b of the transformer T1 starts to commutate from the diode D4 to the switch Tr1.

At this time, the saturable reactor Lsat1 makes an increase in the current of the switch Tr1 gradual to realize a zero-current turn-ON operation. Accordingly, a decrease in the current of the diode D4 becomes gradual to suppress the generation of a turn-OFF recovery loss.

The step-down operation is similar to the step-up operation, and therefore, the explanation thereof is omitted. In the step-down operation, the selector switches SW1 and SW3 are in an ON state and the selector switches SW2 and SW4 in an OFF state. The switches Tr1 and Tr3 are in an OFF state.

The present invention is able to provide a bidirectional DC-DC converter that realizes a simply-configured controller.

(United States Designation)

In connection with United States designation, this international patent application claims the benefit of priority under 35 U.S.C. 119(a) to Japanese Patent Application No. 2012-060534 filed on Mar. 16, 2012 whose disclosed contents are cited herein.

The invention claimed is:

1. A bidirectional DC-DC converter stepping up a DC voltage of a first DC power source for supplying the stepped-up voltage to a second DC power source, and also, stepping down a DC voltage of the second DC power source for supplying the stepped-down voltage to the first DC power source, the bidirectional DC-DC converter comprising:
   a first reactor that includes first and second windings connected in series and electromagnetically coupled with each other;
   a first series circuit that includes the first winding of the first reactor, a second reactor, and a first switch and is connected to both ends of the first DC power source;
   a second series circuit that includes a second switch and the second DC power source and is connected to both ends of the first switch;
   a third series circuit that includes the second winding of the first reactor, a third reactor, a first selector switch, and a first diode and is connected to both ends of a series circuit of the second reactor and first switch, an anode of the first diode being grounded;
   a fourth series circuit that includes a second selector switch, a second diode, and the second DC power source and is connected to both ends of a series circuit of the first selector switch and first diode; and
   a controller turning on/off the first switch, second switch, first selector switch, and second selector switch for carrying out step-up and step-down operations between the first and second DC power sources.

2. The bidirectional DC-DC converter according to claim 1, wherein
   the controller carries out the step-up operation by putting the first selector switch and second switch in an OFF state and the second selector switch in an ON state and carries out the step-down operation by putting the first selector switch in an ON state and the second selector switch and first switch in an OFF state.

3. The bidirectional DC-DC converter according to claim 1, wherein both ends of each of the first and second switches are connected to a diode.

4. A bidirectional DC-DC converter stepping up a DC voltage of a first DC power source for supplying the stepped-up voltage to a second DC power source, and also, stepping, down a DC voltage of the second DC power source for supplying the stepped-down voltage to the first DC power source, the bidirectional DC-DC converter comprising:

first and second transformers each having a primary winding, a coiled winding connected in series with the primary winding, and a secondary winding electromagnetically coupled with the primary winding;

a first series circuit including the primary winding of the first transformer, a first reactor, and a first switch and connected to both ends of the first DC power source;

a second series circuit including a second switch and the second DC power source and connected to both ends of the first switch;

a third series circuit including the coiled winding of the first transformer, a second reactor, a first selector switch, and a first diode and connected to both ends of a series circuit of the first reactor and first switch, an anode of the first diode being grounded;

a fourth series circuit including a second selector switch, a second diode, and the second DC power source and connected to a series circuit of the first selector switch and first diode;

a third reactor connected to a series circuit of the secondary winding of the first transformer and the secondary winding of the second transformer;

a fifth series circuit including the primary winding of the second transformer, a fourth reactor, and a third switch and connected to both ends of the first DC power source;

a sixth series circuit including a fourth switch and the second DC power source and connected to both ends of the third switch;

a seventh series circuit including the coiled winding of the second transformer, a fifth reactor, a third selector switch, and a third diode and connected to both ends of a series circuit of the fourth reactor and third switch;

an eighth series circuit including a fourth selector switch, a fourth diode, and the second DC power source and connected to both ends of a series circuit of the third selector switch and third diode and; and a controller turning on/off the first to fourth switches and first to fourth selector switches for carrying out step-up and step-down operations between the first and second DC power sources.

5. The bidirectional DC-DC converter according to claim 4, wherein the controller carries out the step-up operation by putting the first and third selector switches and second and fourth switches in an OFF state and the second and fourth selector switches in an ON state and carries out the step-down operation by putting the first and third selector switches in an ON state and the second and fourth selector switches and first and third switches in an OFF state.

6. The bidirectional DC-DC converter according to claim 4, wherein both ends of each of the first to fourth switches are connected to a diode.

* * * * *